Figure 9:
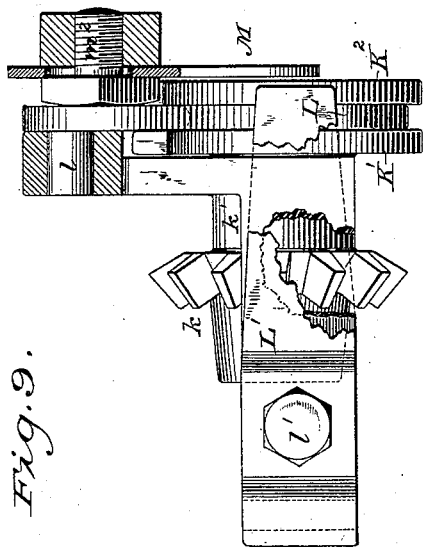

(No Model.)  5 Sheets—Sheet 1.
G. L. PHELPS.
GRAIN BINDER.
No. 496,096. Patented Apr. 25, 1893.
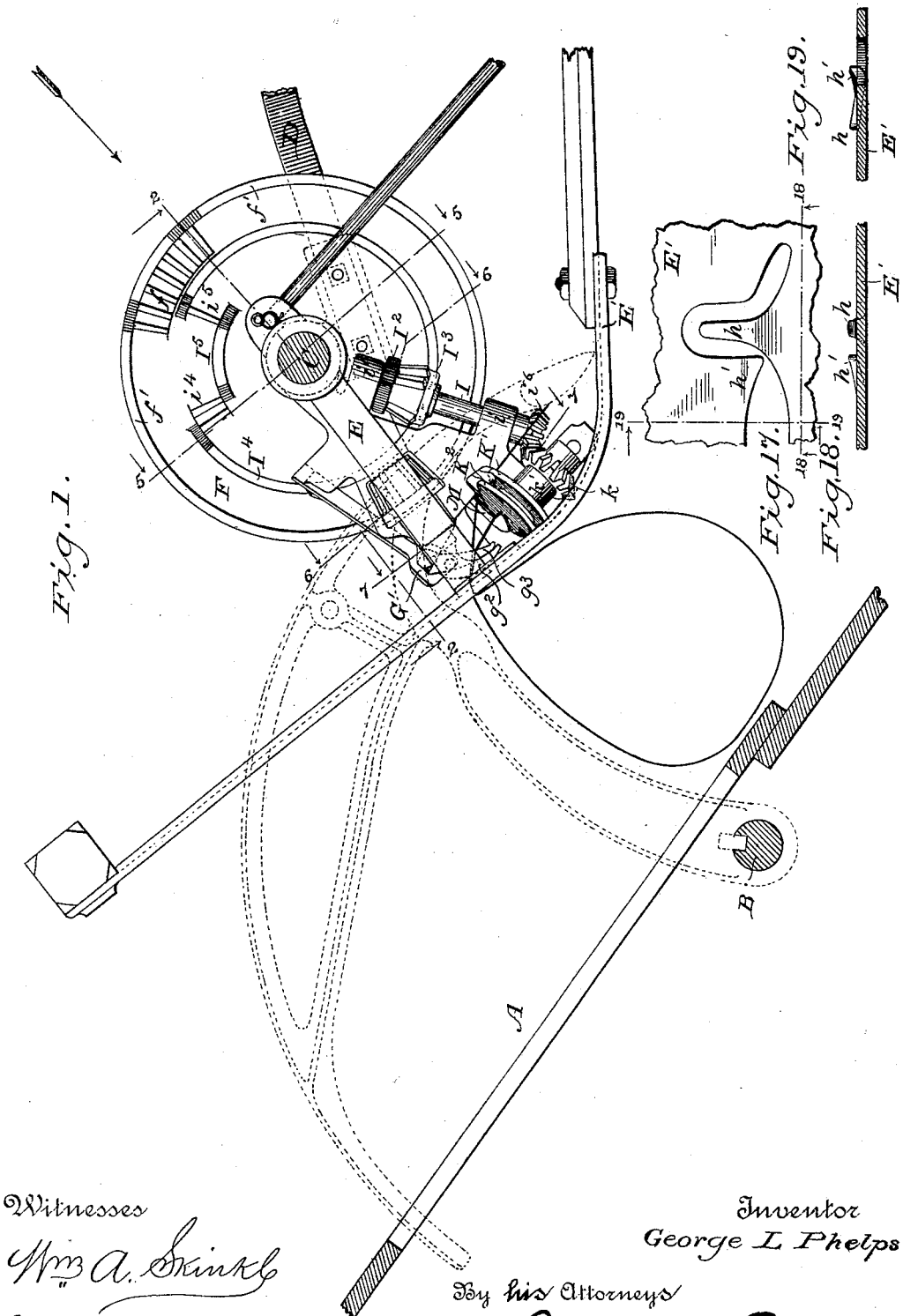
Witnesses
Wm A. Skinkle
Geo. W. Young.
Inventor
George L. Phelps.
By his Attorneys
Parkinson & Parkinson

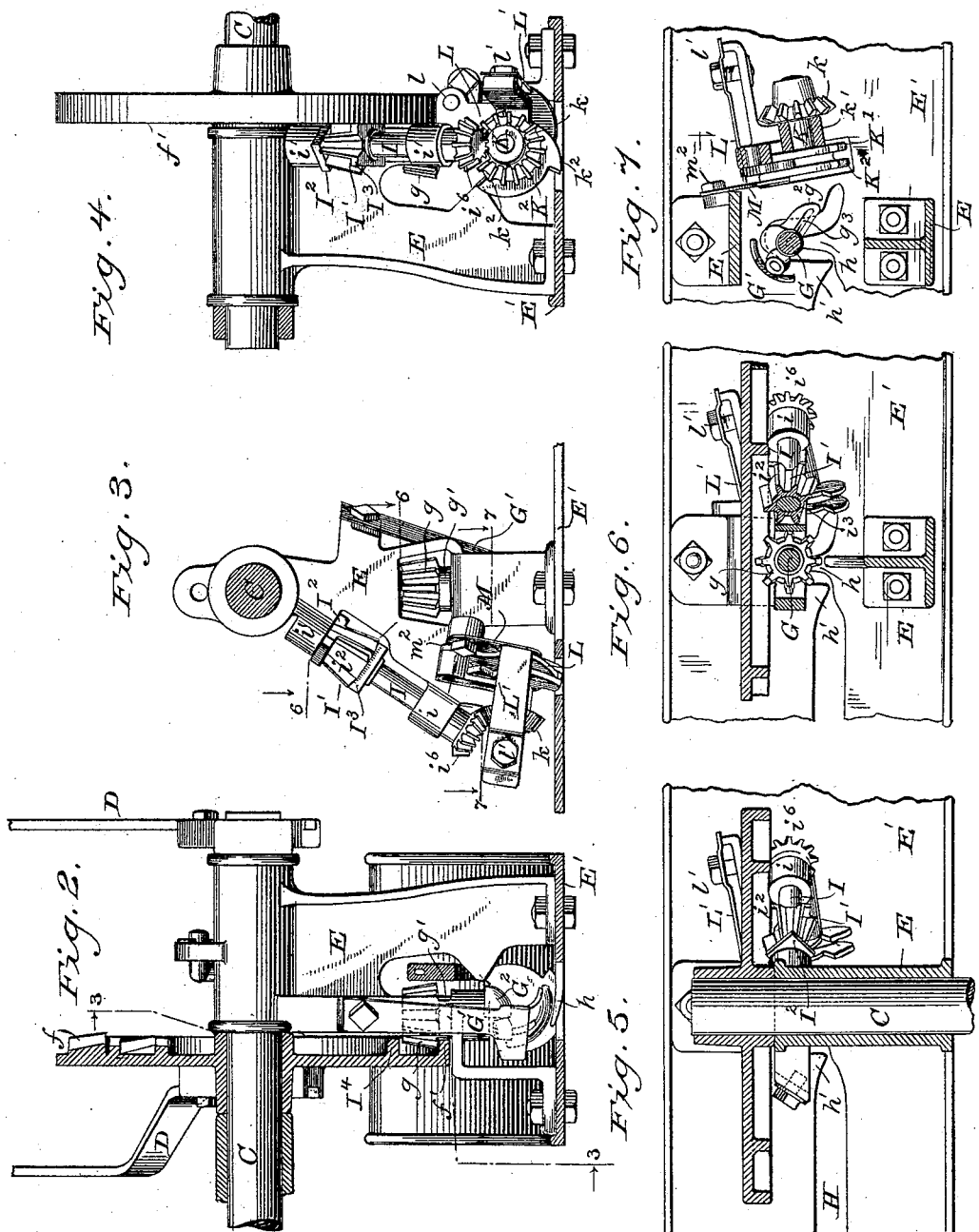

(No Model.) 5 Sheets—Sheet 3.

G. L. PHELPS.
GRAIN BINDER.

No. 496,096. Patented Apr. 25, 1893.

Witnesses
Wm A. Brinkly
Geo. W. Young.

Inventor
George L. Phelps.
By his Attorneys (No Model.)　　　　　　　　　　　　　　　　　5 Sheets—Sheet 4.
G. L. PHELPS.
GRAIN BINDER.
No. 496,096.　　　　　　　　　Patented Apr. 25, 1893.
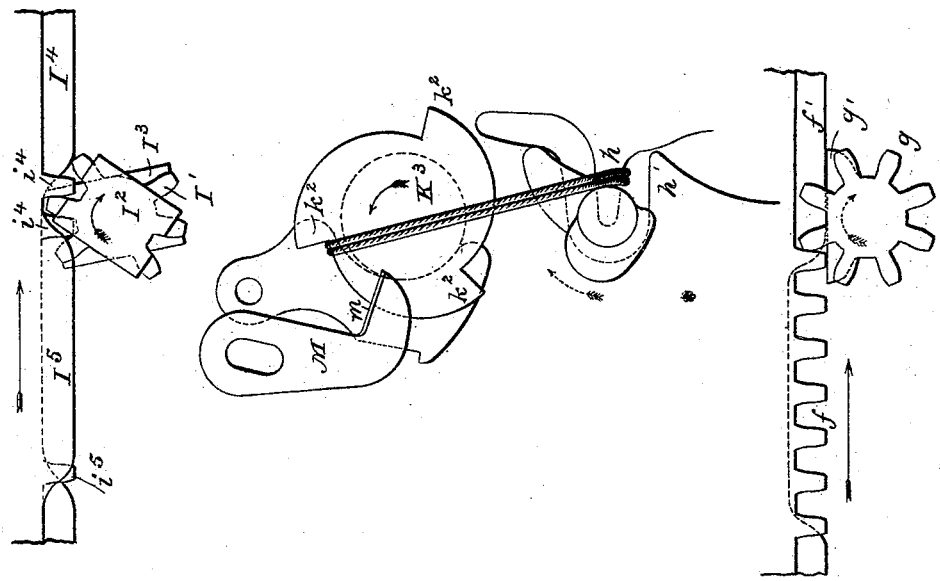
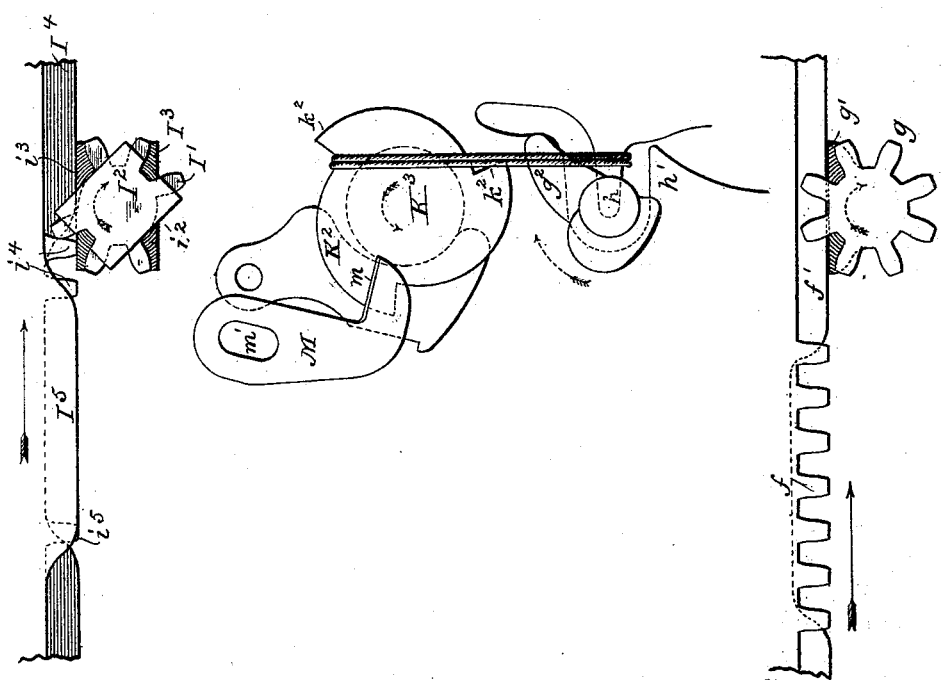
Witnesses
Wm. A. Skinkle.
Geo. W. Young.
Inventor
George L. Phelps
By his Attorneys (No Model.) 5 Sheets—Sheet 5.
G. L. PHELPS.
GRAIN BINDER.
No. 496,096. Patented Apr. 25, 1893.
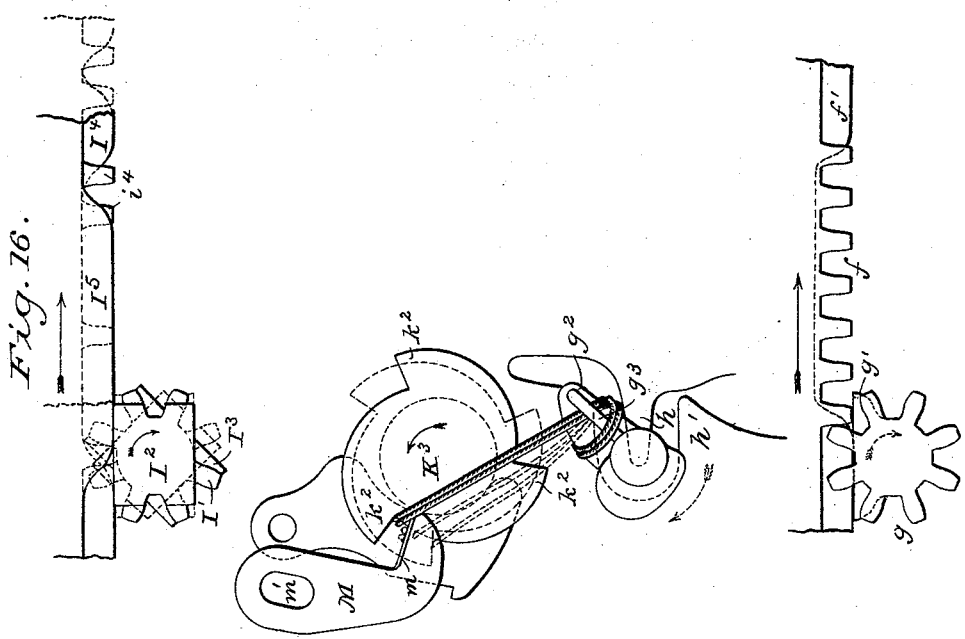
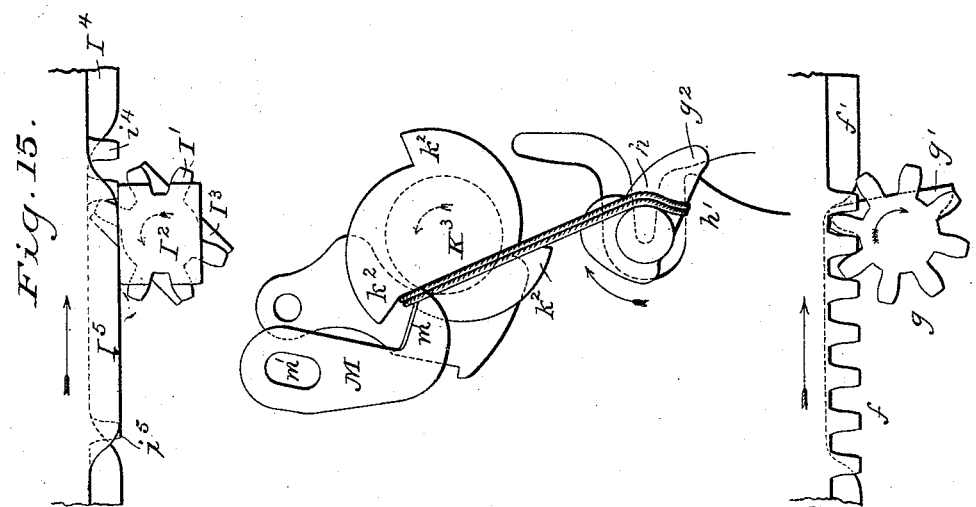
Witnesses
Wm A. Skinkle
Geo. W. Young
Inventor
George L. Phelps
By his Attorneys
Parkinson & Parkinson

UNITED STATES PATENT OFFICE.

GEORGE L. PHELPS, OF CHICAGO, ILLINOIS, ASSIGNOR TO THE McCORMICK HARVESTING MACHINE COMPANY, OF SAME PLACE.

GRAIN-BINDER.

SPECIFICATION forming part of Letters Patent No. 496,096, dated April 25, 1893.

Application filed March 8, 1887. Serial No. 230,103. (No model.)

*To all whom it may concern:*

Be it known that I, GEORGE L. PHELPS, a citizen of the United States, residing at Chicago, in the county of Cook and State of Illinois, have invented certain new and useful Improvements in Grain-Binders, of which the following is a specification.

My invention has for its object to improve the binder made the subject of an application filed by me in the Patent Office of the United States on the 11th day of June, 1885, Serial No. 168,328, which, in turn, relates back to an application filed by me on the 26th day of December, 1883, Serial No. 115,538, wherein is described and claimed the combination of a knotter, mechanism driving it in one direction only and stopping it when the knotter is in the direction, or nearly so, of the line of discharge, and a cord-slot having a finger projecting from that side opposite the knotter, over which finger the twine is laid on the way to the holder, whereby the twine is carried over the end of said finger and to the outer side thereof by the revolution of the knotter.

This present improvement relates especially to the holding mechanism of the binder, its relation to the tying-bill and the manner of driving it, and may be briefly stated as follows: The knotter is driven by a tyer-cam located above the breast-plate in the usual position nowadays, and is practically the ordinary tying-bill; the holder-disk or disks, for I may employ two with a holder-plate between them, are arranged in a plane nearly parallel with the tyer-spindle but oblique to the plane in which the band is delivered and trending inward therefrom toward and past said tyer-spindle; the holder-spindle is oblique to the cord-slot, bringing its outer end directly beneath or adjacent to the tyer-cam, so that it may be driven by bevel gears from a shaft parallel with said cam and actuated thereby. The relations of this shaft and its bevel-wheel to the holder-spindle and its bevel-wheel, and the specific means employed for actuating it will appear from the ensuing description.

Figure 12:
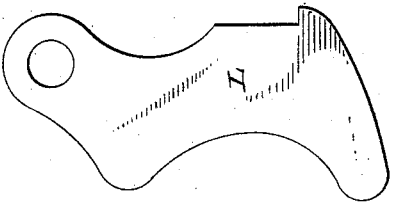
Figure 11:
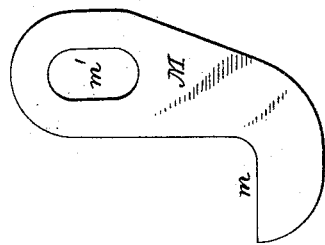
Figure 8:
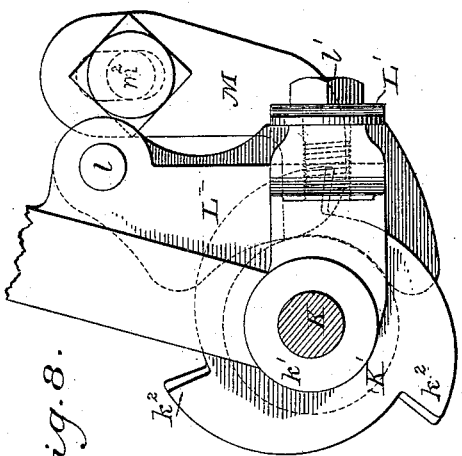
Figure 10:
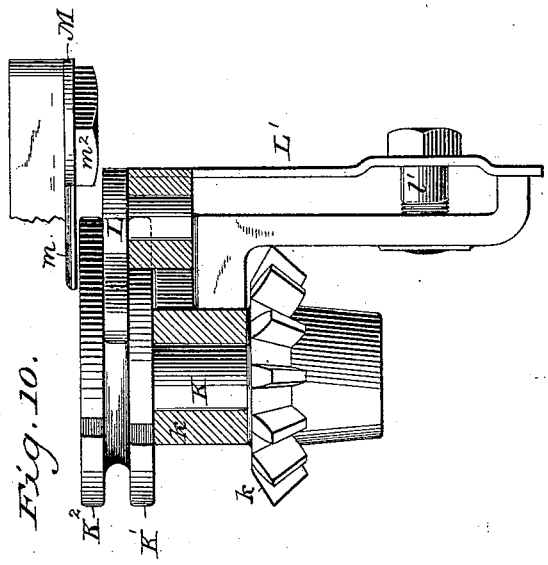

In the drawings; Figure 1 is an elevation from the rear, partly in vertical section, of a binding attachment embodying my invention; Fig. 2, a section through the tying-head on the correspondingly numbered line in the preceding figure, looking in the direction indicated by arrows; Fig. 3, a section on the line likewise indicated in the immediately preceding figure; Fig. 4, an elevation of the tying and holding head seen from the stubble side; Fig. 5, a section through the tyer-frame and cam diametrically of said cam, on the line denoted by like numerals in Fig. 1, and viewed in the direction of the arrows; Figs. 6 and 7, sections through the tying-head as likewise indicated and viewed in first and third figures; Figs. 8, 9 and 10, enlarged details of the holder and cutter, respectively, in stubble-side elevation, front elevation and top plan, the latter two being partly broken away or in section; Figs. 11 and 12, respectively, enlarged views of the knife and holder-plate detached; Figs. 13 to 16, a diagrammatic series illustrating the successive stages of action and relative positions of knotter and holder in the formation of the knot, and Figs. 17, 18 and 19, details of the breast-plate, the first in top-plan and the other two in section on the lines indicated in the former.

A represents the decking or grain-table and B the binder-arm-shaft, the binder-arm itself being shown in broken lines in position for delivering the cord.

C is the tyer-shaft supported as usual in an overhung arm of the main-frame of the binder, and D the ejector-fingers which are carried around by said shaft in its movement. Sleeved to the tyer-shaft is a bracket E, the feet of which are bolted to the breast-plate E' and which constitutes the tyer-frame, and alongside this bracket and keyed to the shaft is the tyer-cam F, having upon its face the usual gear segment $f$ for rotating the knotter, and delay-ledge $f'$ for locking it in position. Mounted in bearings in the tyer-frame alongside the cam is the tyer-spindle G having a bevel-pinion $g$ and delay shoe $g'$ at its upper end as usual, to engage with said gear-segment and delay-ledge, and at its lower end carrying the fixed tying-jaw $g^2$ and the pivoted-jaw $g^3$, the latter of which has its heel extension acted upon by a spring-cam G' and fixed cam G², as customary of late.

The relation of the tyer-pinion and gear-segment on the tyer-cam is such that the knotter is rotated once to each revolution of the cam and is stopped with its jaws trending outward in the direction of the outer extremity of the cord-slot H in the breast-plate. Therefore it is necessary that the slot in the breast-plate should be obstructed that the cord-strands may not escape past the knotter-jaws before their revolution commences and for this reason it is made of the form shown in Figs. 7 and 17, that is to say, a finger $h$ projects from one side until its end comes practically in line with, or even past, the axis of the tyer-spindle, as shown in the first mentioned figure, a suitable recess being formed in the opposite side of the slot, so that there may be a free passage around the end of said finger, and the extreme end of the finger being bent up out of the plane of the breast-plate, to permit the strands to pass easily, though this is not strictly essential. Inside of this stop-finger is a guard-finger $h'$ projecting reversely to near the shoulder of the first and also having its end bent up out of the plane of the breast-plate. This guard-finger serves primarily to deflect the cord, as it is laid in the recession or accession of the binder-arm against the shoulder of the stop-finger and secondly to retain and guide them along the inner edge of said latter finger. So long as the tyer is in the position shown in Fig. 7 with its jaws trending outwardly along the extended portion of the cord-slot beyond said finger, these jaws and the spindle will completely bar the escape of the cord-strands past its end, but when the knotter revolves it will carry the strands around past the end of the stop-finger and bring them into the outer extended portion of the slot so that when the knot is tied and the strands are severed the action of the ejector may bring the strain of the ends grasped between the knotting-jaws in a practically direct line with said jaws and wrench them naturally therefrom.

A short-shaft I is mounted in bearings $i, i'$, in the tyer-frame obliquely to the tyer-spindle but parallel with the face of the tyer-cam and radial to its axis. At the top this shaft has a mutilated gear I' cut away on two sides, as at $i^2, i^3$, and in the present instance having but three teeth on each side of the cut away portions. Above the mutilated gear the shaft has a rectangular delay-shoe $I^2$ with runners on both sides of its longer faces, and beneath the gear a similar delay-shoe $I^3$ placed at such an angle to the first that each substantially corresponds with two opposite non-identical pairs of teeth of the gear, that is, one of the shoes corresponds with the central and diagonally opposite outside teeth of the triplets, and the other with the central and reversely opposite outside teeth of the triplets. A long delay-flange $I^4$ is described upon the face of the tyer-cam to engage with the lower delay-shoe of the shaft, and at its end two gear-teeth $i^4$ are placed which are succeeded by a short delay-flange $I^5$ to engage with the upper delay-shoe and this flange by a single or solitary tooth $i^5$, after which the initial end of the first flange again commences to engage with the opposite side of the lower shoe; the effect of this whole arrangement being to revolve the shaft somewhat less than half a revolution at the engagement with the first two teeth and complete the half revolution by the engagement with the succeeding solitary tooth and with the longer delay-flange. At the foot of the shaft it has a bevel pinion $i^6$ which engages with a bevel-gear $k$ on the end of the holder-spindle, K, which is arranged permanently at an oblique angle to the plane of the tyer-cam trending therefrom inwardly nearly parallel with the breast-plate and toward the cord-slot therein. The proportion between the bevel pinion and bevel-gear in the present instance is intended to be as eight to twelve, so that half of a revolution of the shaft may impart to the holder-spindle one-third of a revolution, the reason for this being that the holder-disk herein has but three teeth or notches, and each is to be brought into action successively in the course of a single full revolution. Should the disk have a greater or less number of notches the proportion will obviously be varied, or else the shaft will be given a greater or less revolution and its driving pinion and delay-shoes suitably modified. The holder-spindle rests in a fixed bearing $k'$ from the tyer-frame, and has at its inner end adjacent to the knotter and to the cord-slot two disks K', K², arranged with a slight space between them and having three forwardly set teeth, $k^2$ forming thereby three notches in which the cord may be laid. Owing to the oblique position of the holder-spindle these disks while lying in a substantially vertical plane, parallel or nearly parallel with the tyer-spindle, are oblique to the cord-slot and trend inward therefrom in the direction of said tyer-spindle, past it or substantially past it, and they turn in the direction in which they trend, that is, away from the cord-slot and toward and past the tyer-spindle. Therefore their teeth are set in that direction. A holder plate L pivoted to the knotter-frame or stock above these disks by a bolt or pin $l$, and curved to partly embrace the neck between them at its lower end while leaving a mouth or opening overhead for the admission of the cord, is pressed into the space between said disks on the side farthest from the cord-slot by means of a spring L', the stress of which is rendered adjustable by set screw $l'$ that the force of the pressure upon the cord may be increased or diminished. A knife M, having a horizontal edge $m$, is also secured to the knotter-frame above the holder-disks in such a position that its blade is brought against the face of the disk nearest the knotter on the same side on which the holder-plate acts and that this knife may be adjustable its stock has an elongated slot $m'$ through which the shank of the set screw $m^2$ by which it is secured passes.

Now referring now to the diagrammatic series of figures, the knotter and holder and the primary pinions by which they are driven, at the moment both strands of cord have been laid and the machine is ready to start are in the relations depicted in Fig. 13, that is, the cord-strands are in a notch in the holder-disks in advance of the plate and some distance therefrom, one strand it will be understood having been previously grasped and being belayed into that notch by the recession of the binder-arm, while the other strand has just been brought up from this notch. The strands extend from the holder past the chin of the knotter and over the stop-finger in the cord-slot and thence around the gavel. Now the two teeth on the tyer-cam strike the mutilated gear and revolve it to the position shown in Fig. 14, completing the initial grasp of the cord, and, owing to the position of the disks relatively to the knotter, and to the direction in which they revolve, carrying the cord against and tending to wrap it around the tyer-spindle, as indicated in said figure. Just at this moment, and before the upper delay-shoe of the mutilated gear has engaged with the short delay-flange, the tyer-spindle engages with its segment-gear and begins to revolve concurrently with the holder, until finally the upper shoe becomes fully engaged with its flange and the holder stops with the cord-strands in the position shown in Fig. 15, just in advance of the knife and bent to a marked extent around the tyer-spindle. This movement of the holder has been but one-quarter of a revolution, and to produce it its operating shaft I has been revolved three eighths of a revolution. The next movement is to complete the third of a revolution so as to bring the succeeding tooth into position to receive the cord-strands for the ensuing operation, but meanwhile the tyer-spindle travels along its gear until one complete revolution of the knotting-jaws has been made. Shortly before this is completed they open to seize the cord-strands, which have been brought by the revolution of the holder-disks into such position that although the tyer comes to a stop with its jaws trending outward at the end of the revolution it meets the strands which at the outset of the binding operation are very little short of parallel with it, much in advance of the end of the revolution, that is, while the knotter winds the loop the holder acts to assist in winding and to bring the strands into a position where they anticipate the termination of the revolution of the knotter. Just as the tyer-spindle passes out of engagement the mutilated gear is struck by the solitary tooth on the tyer-cam and given the additional one-eighth of a revolution necessary to complete its full half-revolution, as indicated in full and broken lines in Fig. 16, thereby driving the holder-disks forward, in the present instance, one-twelfth of a revolution, or the difference between the quarter revolution they have already made and the third of a revolution they are required to make. This one-twelfth of a revolution is sufficient to carry the strands on against the knife-blade and sever them and bring the disks into position to receive the strands for the next binding operation.

I claim—

1. The combination substantially as hereinbefore set forth, with the knotter, and with the breast-plate, of a holder-disk or disks arranged in a plane practically perpendicular to said breast-plate, and oblique to the plane in which the band is laid, so as to trend inwardly from the cord-slot and toward the knotter.

2. The combination, substantially as hereinbefore set forth, with the knotter, of a holder-disk, or disks, arranged in a plane parallel, or nearly parallel, with the spindle of the knotter, but trending inwardly thereto toward from the plane in which the cord is laid, so as to carry the cord toward said knotter and down into position where its ends may be grasped between the jaws of the knotter.

3. The combination substantially as hereinbefore set forth, of the tyer-cam, the radial shaft I, driven thereby and having bevel pinion at its foot, the holder-spindle mounted in a fixed bearing and trending obliquely away from the tyer-cam, inward and toward the cord-slot, and having bevel gear meshing with said bevel pinion, the holder-disk on the inner end of said spindle, and the holder-plate.

4. The combination substantially as hereinbefore set forth, of the tyer-cam, the knotter and its spindle, the radial shaft I driven by the tyer-cam, the holder-spindle mounted in a fixed bearing and trending obliquely away from the tyer-cam inward and toward the cord slot and driven directly from said shaft by bevel-gears, the holder-disks at the inner end of said spindle arranged practically as set forth, and the holder-plate, whereby the cord-strands are carried partly around the tyer-spindle and down toward the knotting-jaws by the revolution of the holder-disks.

5. The combination substantially as hereinbefore set forth, of the tyer-cam, the knotter given a single revolution thereby and stopped with its jaws trending outwardly in the direction of the cord-slot, the stop finger in said cord-slot, the oblique holder-disks trending inwardly from the cord-slot and past the tyer-spindle and fixed as to position, the holder-plate, and mechanism driving said holder-disks to carry the cord-strands against and partly past the tyer-spindle and bring them down in position to be grasped by the knotter-jaws as they come around before the completion of their revolution.

6. The combination substantially as hereinbefore set forth, of the tyer-cam, the holder-disks, the holder-plate, the stationary knife and mechanism operated by said tyer-cam whereby the holder-disks are given a partial movement to grasp the cord-strands, and then stopped during the tying-operation, then again moved to carry said strands against the stationary knife and sever them.

7. The combination substantially as hereinbefore set forth, of the tyer-cam, the cord-knotter and its spindle driven by said cam, the shaft I, the mutilated gear, and its two delay-shoes, the delay-flanges on said tyer-cam engaging with said shoes, the two teeth at the end of the longer delay-flange, and the solitary tooth at the end of the shorter, the bevel pinion at the foot of the shaft, the holder-spindle and its bevel gear meshing with said pinion, the holder-disks and their plate, and the stationary knife.

8. The combination substantially as hereinbefore set forth, of the holder-disks, the holder-plate, the adjustable knife stock having the angular blade, and mechanism which imparts a partial rotation to said disks, then stops them during the tying operation, then again moves them to carry the strands past the blade.

GEORGE L. PHELPS.

Witnesses:
ALICE S. WELLS,
LEONARD VASSALL.